US012126895B2

(12) United States Patent
Tamaki

(10) Patent No.: US 12,126,895 B2
(45) Date of Patent: Oct. 22, 2024

(54) SIDE-VIEW HEAD AND EAR IMAGE CAPTURING FOR HEAD RELATED TRANSFER FUNCTIONS

(71) Applicant: SONY GROUP CORPORATION, Tokyo (JP)

(72) Inventor: Hiroshi Tamaki, Tokyo (JP)

(73) Assignee: Sony Group Corporation, Tokyo (JP)

(*) Notice: Subject to any disclaimer, the term of this patent is extended or adjusted under 35 U.S.C. 154(b) by 162 days.

(21) Appl. No.: 17/416,622

(22) PCT Filed: Dec. 26, 2019

(86) PCT No.: PCT/JP2019/051059
§ 371 (c)(1),
(2) Date: Jun. 21, 2021

(87) PCT Pub. No.: WO2020/138258
PCT Pub. Date: Jul. 2, 2020

(65) Prior Publication Data
US 2022/0078338 A1    Mar. 10, 2022

(30) Foreign Application Priority Data
Dec. 28, 2018 (JP) ................................ 2018-246623

(51) Int. Cl.
*H04N 23/60* (2023.01)
*G06V 40/16* (2022.01)
(Continued)

(52) U.S. Cl.
CPC ........... *H04N 23/64* (2023.01); *G06V 40/166* (2022.01); *H04N 23/611* (2023.01); *H04S 7/303* (2013.01)

(58) Field of Classification Search
CPC ...... G06V 40/67; G06V 40/166; H04N 23/64; H04N 23/611; H04S 7/304; H04S 7/303
See application file for complete search history.

(56) References Cited

U.S. PATENT DOCUMENTS 9,544,706 B1    1/2017  Hirst
9,602,803 B2 *  3/2017  Tamura ................. A63F 13/213
(Continued)

FOREIGN PATENT DOCUMENTS

CN        1658224 A      8/2005
CN      106470315 A      3/2017
(Continued)

OTHER PUBLICATIONS

S. Spagnol, D. Rocchesso, M. Geronazzo and F. Avanzini, "Automatic extraction of pinna edges for binaural audio customization," 2013 IEEE 15th International Workshop on Multimedia Signal Processing (MMSP), Pula, Italy, 2013, pp. 301-306, doi: 10.1109/MMSP.2013.6659305. (Year: 2013).*

(Continued)

*Primary Examiner* — Michael Robert Cammarata
(74) *Attorney, Agent, or Firm* — Sheridan Ross PC

(57) ABSTRACT

An information processing apparatus according to the present disclosure includes: a first determination unit that determines whether a size of a region occupied by a user's front-view face in an imaging region is within a threshold; a second determination unit that determines whether a size of a region occupied by a user's side-view face in the imaging region is within a threshold in a case where there has been a determination that the size of the region occupied by the user's front-view face is within the threshold; and an imaging unit that images the user's side-view face in a case where there has been a determination that the size of the region occupied by the user's side-view face is within the threshold.

20 Claims, 8 Drawing Sheets

(51) Int. Cl.
*H04N 23/611* (2023.01)
*H04S 7/00* (2006.01)

(56) References Cited

U.S. PATENT DOCUMENTS

| | | | | |
|---|---|---|---|---|
| 10,038,966 | B1* | 7/2018 | Mehra | G06V 40/168 |
| 11,562,471 | B2* | 1/2023 | Vanne | H04N 23/64 |
| 11,570,559 | B2* | 1/2023 | Kvist | H01Q 9/16 |
| 2001/0019620 | A1* | 9/2001 | Nagai | G06V 40/161 |
| | | | | 382/104 |
| 2010/0066840 | A1 | 3/2010 | Asukai | |
| 2010/0157129 | A1* | 6/2010 | Lee | H04N 23/635 |
| | | | | 348/E5.022 |
| 2012/0133746 | A1* | 5/2012 | Bigioi | H04N 13/221 |
| | | | | 348/E13.074 |
| 2012/0183161 | A1* | 7/2012 | Agevik | H04S 7/302 |
| | | | | 381/303 |
| 2013/0308835 | A1* | 11/2013 | Thorson | H04M 1/72448 |
| | | | | 382/118 |
| 2014/0254891 | A1* | 9/2014 | Lee | G06V 40/166 |
| | | | | 382/118 |
| 2016/0026781 | A1* | 1/2016 | Boczek | G06V 40/10 |
| | | | | 726/18 |
| 2016/0063235 | A1* | 3/2016 | Tussy | H04W 12/06 |
| | | | | 726/6 |
| 2016/0371812 | A1* | 12/2016 | Tsukamoto | G06V 40/172 |
| 2018/0091732 | A1* | 3/2018 | Wilson | H04N 23/631 |
| 2018/0373957 | A1* | 12/2018 | Lee | G06T 7/0002 |
| 2019/0045317 | A1* | 2/2019 | Badhwar | H04S 7/302 |
| 2019/0080066 | A1* | 3/2019 | Van Os | G06V 10/17 |
| 2019/0087972 | A1* | 3/2019 | Huttunen | G06T 17/00 |
| 2019/0180088 | A1* | 6/2019 | Norimatsu | G07C 9/253 |
| 2019/0304081 | A1* | 10/2019 | Vanne | G06V 10/993 |
| 2020/0104620 | A1* | 4/2020 | Cohen | G06F 21/32 |
| 2021/0144506 | A1* | 5/2021 | Milne | G06F 3/0488 |
| 2021/0182585 | A1* | 6/2021 | Ionita | G06V 40/166 |
| 2021/0211825 | A1* | 7/2021 | Joyner | G06T 7/70 |
| 2022/0222976 | A1* | 7/2022 | Tsuda | G06V 40/172 |
| 2022/0294980 | A1* | 9/2022 | Tamaki | G06V 40/172 |

FOREIGN PATENT DOCUMENTS

| | | | | |
|---|---|---|---|---|
| CN | 106599779 A | | 4/2017 | |
| CN | 107730450 A | | 2/2018 | |
| CN | 107925724 A | | 4/2018 | |
| CN | 110321768 A | * | 10/2019 | G06K 9/00221 |
| EP | 4075396 A1 | * | 10/2022 | |
| JP | 2008-118276 | | 5/2008 | |
| JP | 2009-033544 | | 2/2009 | |
| JP | 2017108240 A | | 6/2017 | |
| JP | 6431225 B1 | * | 11/2018 | |
| JP | 2020088557 A | * | 6/2020 | G06K 9/00255 |
| KR | 20170023494 A | | 3/2017 | |
| WO | WO-2017130407 A1 | | 8/2017 | |
| WO | WO 2017/208853 | | 12/2017 | |

OTHER PUBLICATIONS

A. Reichinger, p. Majdak, R. Sablatnig and S. Maierhofer, "Evaluation of Methods for Optical 3-D Scanning of Human Pinnas," 2013 International Conference on 3D Vision—3DV 2013, Seattle, WA, USA, 2013, pp. 390-397, doi: 10.1109/3DV.2013.58. (Year: 2013).*
International Search Report prepared by the Japan Patent Office on Mar. 6, 2020, for International Application No. PCT/JP2019/051059.

* cited by examiner

SIDE-VIEW HEAD AND EAR IMAGE CAPTURING FOR HEAD RELATED TRANSFER FUNCTIONS

CROSS REFERENCE TO RELATED APPLICATIONS

This application is a national stage application under 35 U.S.C. 371 and claims the benefit of PCT Application No. PCT/JP2019/051059 having an international filing date of 26 Dec. 2019, which designated the United States, which PCT application claimed the benefit of Japanese Patent Application No. 2018-246623 filed 28 Dec. 2018, the entire disclosures of each of which are incorporated herein by reference.

FIELD

The present disclosure relates to an information processing apparatus, an information processing method, and an information processing program. The present disclosure specifically relates to the use of head-related transfer functions.

BACKGROUND

There is a technique that uses a head-related transfer function that mathematically expresses how sound reaches the ears from a sound source so as to three-dimensionally reproduce a sound image in headphones or the like.

Since the head-related transfer function varies greatly from person to person, it is desirable to use a head-related transfer function generated for each of persons at application. For example, there is a known technology that generates a three-dimensional digital model (hereinafter referred to as "3D model") of a head based on a captured image of the user's pinna and calculates a head-related transfer function of the user from the generated 3D model.

CITATION LIST

Patent Literature

Patent Literature 1: U.S. Pat. No. 9,544,706

SUMMARY

Technical Problem

With the conventional technique, the head-related transfer function calculated individually for each of users can be applied to information processing, leading to enhancement of the sense of localization of the sound image.

Unfortunately, however, the above-described conventional technique has a difficulty in improving the convenience of the user. For example, the head-related transfer function in the conventional technique is calculated using an image of the user's pinna. However, it is difficult for the user to obtain an image of the pinna, it is conceivable to have a case where an imaging failure occurs or the pinna of an appropriate size is not included in the captured image. In this case, the user might be required to repeat the imaging many times, or might not be able to obtain a head-related transfer function calculated with high accuracy.

In view of these, the present disclosure proposes an information processing apparatus, an information processing method, and an information processing program capable of improving the convenience of the user regarding the imaging performed to calculate the head-related transfer function.

Solution to Problem

To solve the problem described above, an information processing apparatus includes: a first determination unit that determines whether a size of a region occupied by a user's front-view face in an imaging region is within a threshold; a second determination unit that determines whether a size of a region occupied by a user's side-view face in the imaging region is within a threshold in a case where there has been a determination that the size of the region occupied by the user's front-view face is within the threshold; and an imaging unit that images the user's side-view face in a case where there has been a determination that the size of the region occupied by the user's side-view face is within the threshold.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

The present disclosure will be described in the following order.

1. Embodiments
  1-1. Example of configuration of information processing system and information processing according to an embodiment
  1-2. Configuration of information processing apparatus according to an embodiment
  1-3. Configuration of cloud server according to an embodiment
  1-4. Procedure of information processing according to an embodiment
2. Modification
3. Other embodiments
4. Effects of information processing apparatus according to the present disclosure
5. Hardware configuration

1. Embodiments

[1-1. Example of Configuration of Information Processing System and Information Processing According to an Embodiment]

Figure 1:
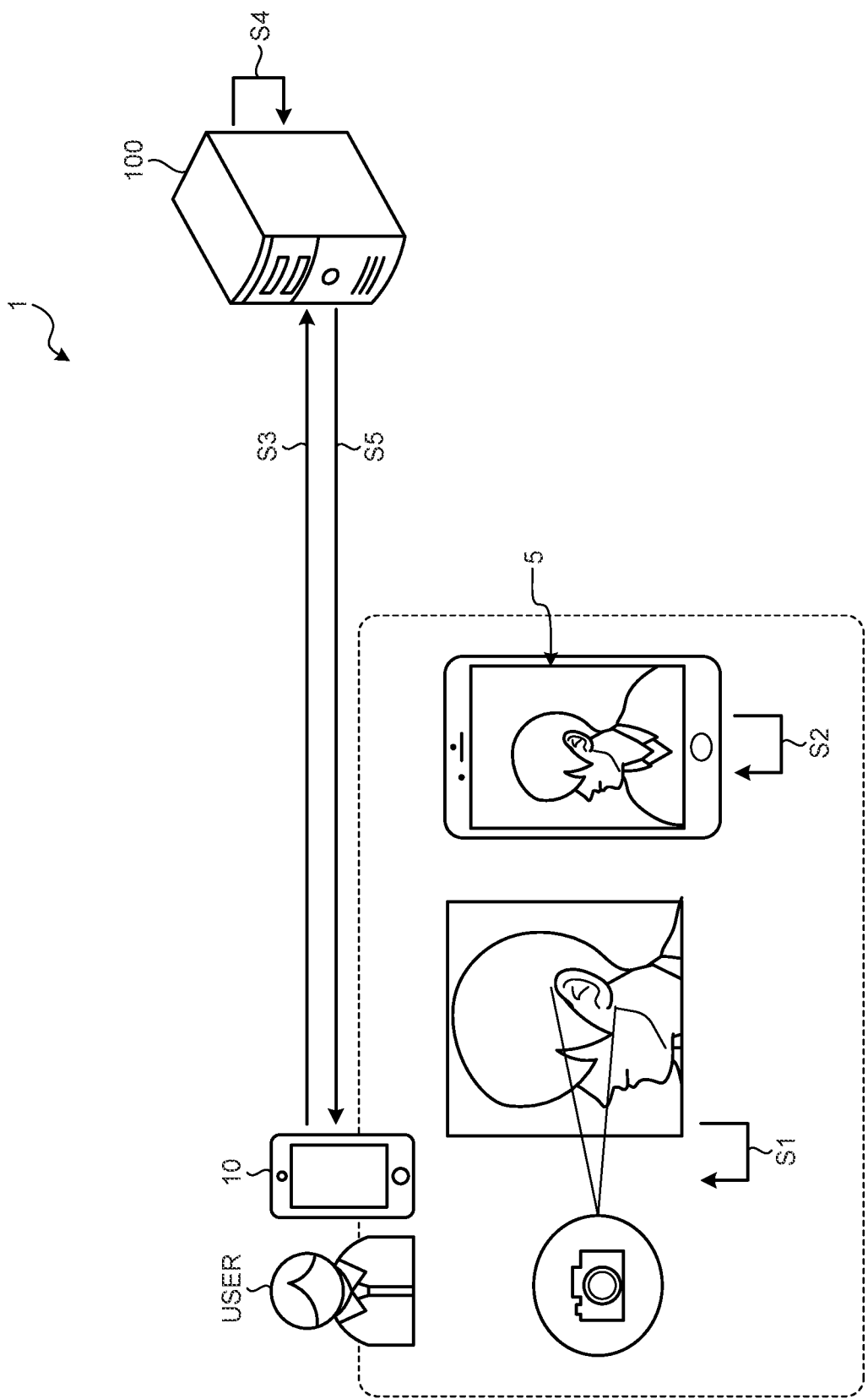
FIG. 1 is a diagram illustrating an outline of information processing system according to an embodiment of the present disclosure.
Figure 2:
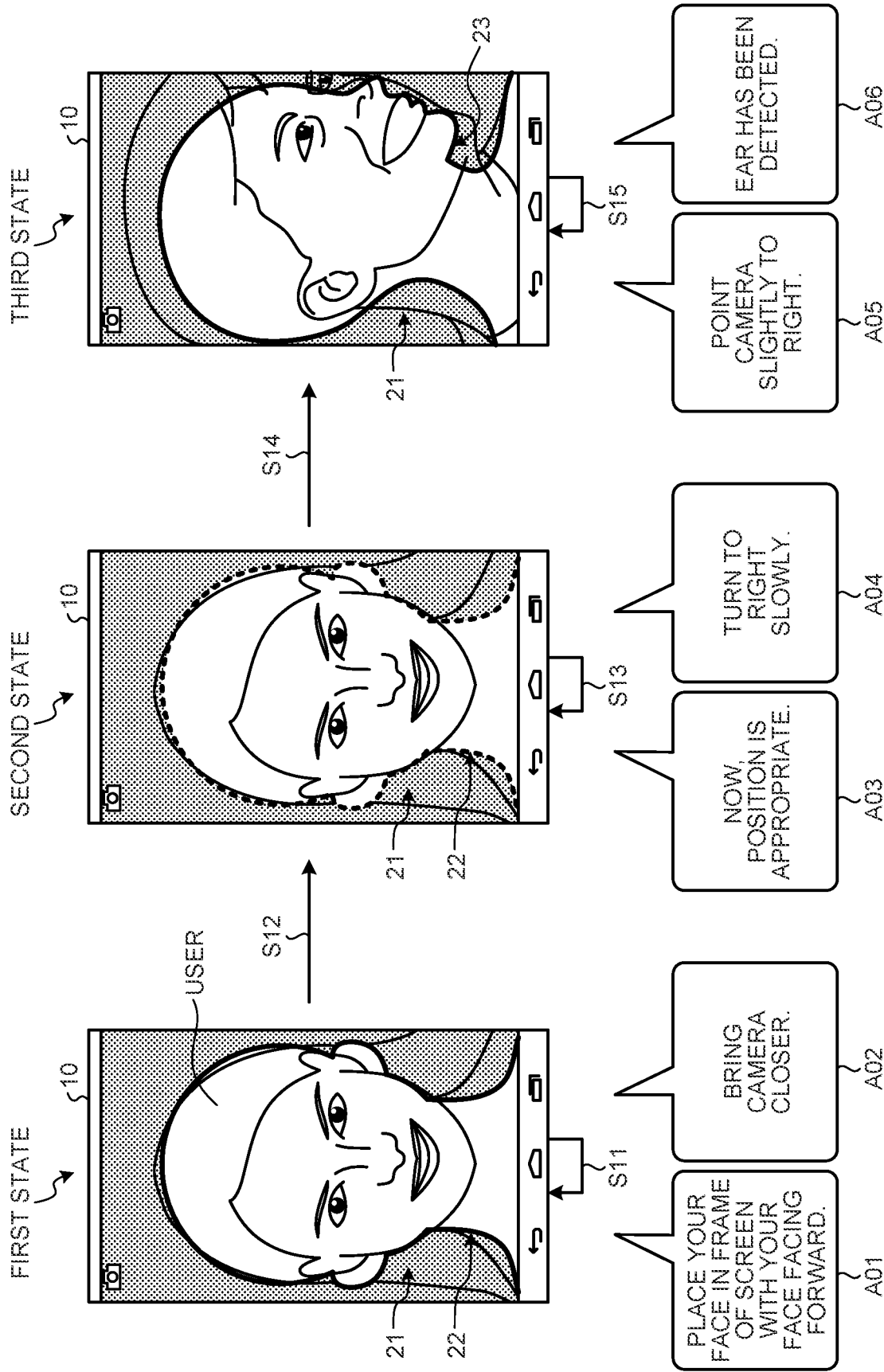
FIG. 2 is a conceptual diagram illustrating information processing according to an embodiment.

First, a configuration of an information processing system 1 according to the present disclosure and an outline of information processing executed by the information processing system 1 will be described with reference to FIGS. 1 and 2. FIG. 1 is a diagram illustrating the information processing system 1 according to an embodiment of the present disclosure. Information processing according to an embodiment of the present disclosure is implemented by the information processing system 1 illustrated in FIG. 1. As illustrated in FIG. 1, the information processing system 1 includes a user terminal 10 and a cloud server 100. Individual devices included in the information processing system 1 communicates with each other using a wired or wireless network (not illustrated). The number of each of devices constituting the information processing system 1 is not limited to the number illustrated in the figure.

The user terminal 10 is an example of the information processing apparatus according to the present disclosure, and is an information processing terminal that executes information processing using a head-related transfer function (HRTF) (hereinafter, referred to as simply HRTF). Specifically, by using the HRTF at playback of music, movies, or the like, the user terminal 10 can perform highly realistic playback or construct highly effective 3D sound. The user terminal 10 is actualized by a smartphone or the like having an imaging function, for example.

The cloud server 100 calculates the HRTF corresponding to each of users and provides the calculated HRTF to the user terminal 10. The cloud server 100 acquires a captured image of the user's ear from the user terminal 10 via a network, and calculates the HRTF of the user based on the acquired image.

As described above, the user terminal 10 executes information processing using the HRTF. The HRTF expresses a change in sound caused by peripheral objects including the shape of the human pinna (auricle) and the head, as a transfer function. Generally, the measurement data for obtaining the HRTF is acquired by measuring acoustic signals for measurement using a microphone or a dummy head microphone worn by a human in its pinna.

For example, HRTFs used in technologies such as 3D sound are often calculated using measurement data acquired by a dummy head microphone or the like, or using an average value of measurement data acquired from a large number of human beings. However, since HRTFs vary greatly from person to person, it is desirable to use the user's own HRTF in order to realize a more effective acoustic effect. That is, by replacing the generic HRTF with the user's own HRTF, it is possible to provide the user with a more realistic acoustic experience.

Examples of the method for calculating the user's individual HRTF include a method of calculating the user's HRTF from a captured image of the shape of the user's ear. For example, the cloud server 100 acquires an image including the shape of the user's ear captured by the user terminal 10, and calculates the HRTF of the individual user based on the acquired image. Subsequently, the cloud server 100 transmits the calculated HRTF to the user terminal 10. This enables the user terminal 10 to perform playback of a sound source being a recording of 3D sound and realistic playback of a movie, by using the user's individual HRTF.

Unfortunately, however, there are some problems in implementation of the above method. For example, the cloud server 100 acquires an image from which the shape of the user's ear is recognizable and calculates the HRTF based on the acquired image. In this case, the user needs to capture an image including their own ear and upload the captured image to the cloud server 100. At this time, it is assumed that the user performs imaging using a smartphone such as the user terminal 10 having an imaging function.

Unfortunately, however, when the user captures their side-view image, the user has a difficulty in properly capturing the ear because the user cannot confirm the imaging region (that is, the screen on the user terminal 10). Therefore, even when the user captures their side-view image, there is a high possibility to have a captured image in which the ear is not included in the image or the ear is extremely inclined. In this case, the user might be required to repeat the imaging many times, or might not be able to obtain a HRTF calculated with high accuracy. In addition, depending on the shape of the user terminal 10, it might be difficult for the user to press the shutter button at an appropriate timing. Furthermore, such a selfie is assumed to be captured by the user oneself with a hand-held user terminal 10, leading to a high possibility of occurrence of blurring in the captured image.

As described above, there are various problems regarding the imaging performed to calculate the HRTF. The user terminal 10 according to the embodiment solves the above-described problems by using the information processing of the present disclosure described below. Hereinafter, an outline of the information processing according to the present disclosure will be described step by step with reference to FIGS. 1 and 2.

First, a flow of a HRTF generation process by the information processing system 1 will be outlined with reference to FIG. 1. As illustrated in FIG. 1, the user captures a self-portrait as a side-view of the head in order to acquire an image including an image of an own ear (Step S1). A detailed description of the imaging process by the user terminal 10 will be described with reference to FIG. 2 and subsequent figures. Furthermore, an image in the present disclosure is not limited to a two-dimensional color image that can be typically captured by the user terminal 10 or the like, but may be a monochrome image, a depth image including depth information, or an image obtained by combining these in any manner. In addition, the image used in the processes of the present disclosure may be a plurality of images instead of one image.

The user terminal 10 acquires an image 5 as a side-view image of the user's head captured by the imaging in Step S1 and from which the shape of the user's ear is recognizable (Step S2).

Subsequently, the user terminal 10 transmits the acquired image 5 to the cloud server 100 (Step S3). The cloud server 100 acquires the image transmitted from the user terminal 10. Next, the cloud server 100 calculates the user's HRTF from the image (Step S4). Various methods may be adopted as the method that the cloud server 100 can use to calculate the HRTF. For example, in a case where a two-dimensional image including the image of the ear has been input, the cloud server 100 may calculate the HRTF using a model trained to output the HRTF corresponding to the ear. Alternatively, the cloud server 100 may generate a 3D model of the user's head from a two-dimensional image including an ear image, and may calculate the HRTF from the generated 3D model. In the following description, the HRTF calculated according to the individual user may be referred to as a personalized HRTF (personal HRTF) to distinguish it from a generic HRTF.

Furthermore, by applying convolution of a Room Impulse Response (RIR) into the calculated personalized HRTF, the cloud server 100 may generate a Binaural Room Impulse Response (BRIR). In the present specification, when the term HRTF is used, it shall include not only HRTF but also information such as BRIR generated by using the HRTF. For example, although the data used at playback of music on the user terminal 10 might actually be BRIR instead of HRTF, both the BRIR and HRTF may be read interchangeably in the following description. For example, a description such as "transmit a calculated HRTF" also includes a situation of transmitting a calculated BRIR. In addition, the description such as "playback using HRTF" shall include a situation of performing playback using BRIR.

Thereafter, the cloud server 100 transmits the generated personalized HRTF to the user terminal 10 (Step S5). The user terminal 10 acquires a personalized HRTF. In this manner, the user acquires an own personalized HRTF by capturing a self side-view face image and transmitting the image to the cloud server 100. Thereafter, the user terminal 10 can use a personalized HRTF corresponding to the user, for example, at the time of playback of a 3D sound or a multi-channel sound source.

Next, an outline of the information processing (an imaging process) according to the present disclosure by the user terminal 10 will be described with reference to FIG. 2. FIG. 2 is a conceptual diagram illustrating information processing according to an embodiment. FIG. 2 illustrates an image displayed on a screen of the user terminal 10 when the user takes a selfie. In other words, the screen of the user terminal 10 illustrated in FIG. 2 indicates a region to be imaged by the user terminal 10. In illustration of the state transition of the user terminal 10 in the description of FIG. 2, the screen display state of the user terminal 10 is expressed as a first state, a second state, . . . , an Nth state (N is an arbitrary number). In the following description, a known image recognition method may be appropriately used as a method for recognizing the front or side of the user, or the ear of the user.

When the user desires to generate a personalized HRTF, the user starts an imaging function and captures an image of one's ear. This imaging function is implemented by an application program (hereinafter, simply referred to as an "application") provided by a provider that manages the cloud server 100.

When the user starts the application, the user terminal 10 transitions to the first state. An imaging region 21 illustrated in FIG. 2 is a region in which the user terminal 10 intends to capture an image. That is, the imaging region 21 is a display, on the screen, of a space captured by the camera included in the user terminal 10. As illustrated in FIG. 2, the user terminal 10 first outputs a voice A01 prompting the user to take a user's front-view image (Step S11). For example, the user terminal 10 outputs the voice A01 having a message such as "Place your face in the frame of screen with your face facing forward". In this manner, the user terminal 10 gives appropriate information and feedback to the user by appropriately performing output by text-to-speech (TTS). Note that such a response process is not limited to execution by voice, and may be performed by a method such as vibration that vibrates the user terminal 10 or a method of displaying a character string on the screen. Furthermore, the user terminal 10 may output not only the TTS but also a shutter sound, a sound effect indicating that an appropriate imaging has been performed, or the like, as voice.

That is, rather than suddenly prompting the user to take a side-view image, the user terminal 10 first outputs a response for determining the front-view position of the user. In a case of a front-view image, the user can recognize the position and size of own face while holding the user terminal 10 in hand. In this manner, the user terminal 10 first displays the user's front-view face on the screen, and makes adjusting so that the user will be located at a position suitable for imaging. With this adjustment, the user terminal 10 can improve the probability that the subsequent imaging of the side of the head will be successful.

In the first state, the user terminal 10 determines whether the position and size of the user's face are located at positions suitable for imaging in the imaging region 21. At this time, the user terminal 10 may display a guide frame 22 on the screen for the user to adjust the position and size of the front face. This enables the user to adjust the position of one's own face and the position of the user terminal 10 held in hand with reference to the guide frame 22.

The user terminal 10 determines whether the size of the region occupied by the user's front-view face in the imaging region 21 is within a threshold. At this time, the user terminal 10 may output a response as appropriate according to the position and size of the user's face. For example, when the size of the user's face is displayed too small with respect to the imaging region 21 or the guide frame 22, the user terminal 10 may output a voice A02 such as "Bring the camera closer" to prompt the user to bring the face or the user terminal 10 to appropriate positions.

When the user terminal 10 determines that the size of the region occupied by the user's front-view face in the imaging region 21 is within the threshold, the user terminal 10 transitions to the second state (Step S12).

In the second state, the user terminal 10 changes the color of the guide frame 22 or outputs a voice A03 such as "Now, the position is appropriate", so as to tell the user that the position of the user's face is suitable for imaging (Step S13).

Subsequently, the user terminal 10 outputs a voice A04 such as "Turn to the right slowly" to prompt the user to face one's side toward the camera (that is, the user terminal 10).

After outputting the voice A04, the user terminal 10 transitions to a third state (Step S14). In the third state, the user terminal 10 turns off the guide frame 22 and newly displays a side guide frame 23 in the imaging region 21.

The user terminal 10 determines whether the size of the region occupied by the side-view face of the user in the imaging region 21 is within a threshold. More specifically, the user terminal 10 determines whether the region including the user's ear is at an appropriate position with respect to the imaging region 21. Examples of the appropriate position include cases where there is no portion of the region including the ear deviating from the end of the imaging region 21, the ratio of the region including the ear to the imaging region 21 is within a threshold, or the ratio of the region including the ear to the side of the user's head is within a threshold. In other words, the appropriate position represents a position where the user's ear is estimated to be included in the captured image to the extent that would not hamper the operation of generating HRTFs by the cloud server 100.

The user terminal 10 may output a response as appropriate when the position of the side of the user's head or the ear is not appropriate. For example, when the region including the user's ear is out of the imaging region 21 or the guide frame 23, the user terminal 10 may output a voice A05 such as "Point the camera slightly to the right" to prompt the user to move their face or the user terminal 10 to an appropriate position.

Thereafter, having determined that the size of the region occupied by the user's side-view face is within the threshold, in other words, the region including the user's ear comes at an appropriate position in the imaging region 21, the user terminal 10 outputs a voice A06 such as "The ear has been detected" (Step S15).

Furthermore, the user terminal 10 determines whether the amount of behavior of the user terminal 10 (for example, the acceleration or speed of the user terminal 10 itself) is within a threshold and whether there is no movement of position of the user's ear once detected that goes beyond a threshold in the next frame. When the amount of behavior of the user terminal 10 or the amount of movement of the position of the user's ear is within the threshold, the user terminal 10 automatically captures a side-view image of the user's head. Note that such processes are provided to prevent occurrence of blurring in the captured image.

As described above, the user terminal 10, which is an example of the information processing apparatus according to the present disclosure, determines whether the size of the region occupied by the front-view face of the user is within a threshold and then determines whether the size of the region occupied by the side-view face of the user is within a threshold, in the imaging region 21. The user terminal 10 captures a side-view face image of the user in a case where there has been a determination that the size of the region occupied by the side-view face of the user is within the threshold.

That is, after performing positioning with the front-view face to allow the user to obtain a self view with better visibility, the user terminal 10 images the side view of the user's head. In this manner, by executing the process for capturing the side-view image of the user's head step by step, the user terminal 10 can reliably capture an image that is difficult to take by selfie, that is, a side-facing image including the ear at an appropriate position. This enables the user terminal 10 to reduce the probability of a failure in imaging, leading to the reduction of the labor and burden on the user. As a result, the user terminal 10 can improve the convenience of the user with respect to the imaging performed to calculate the head-related transfer function.

The outline of the overall flow of information processing according to the present disclosure has been described above. With FIG. 3 and subsequent figures, the configuration of the user terminal 10 will be described, as well as the details of various processes.

[1-2. Configuration of Information Processing Apparatus According to an Embodiment]

Figure 3:
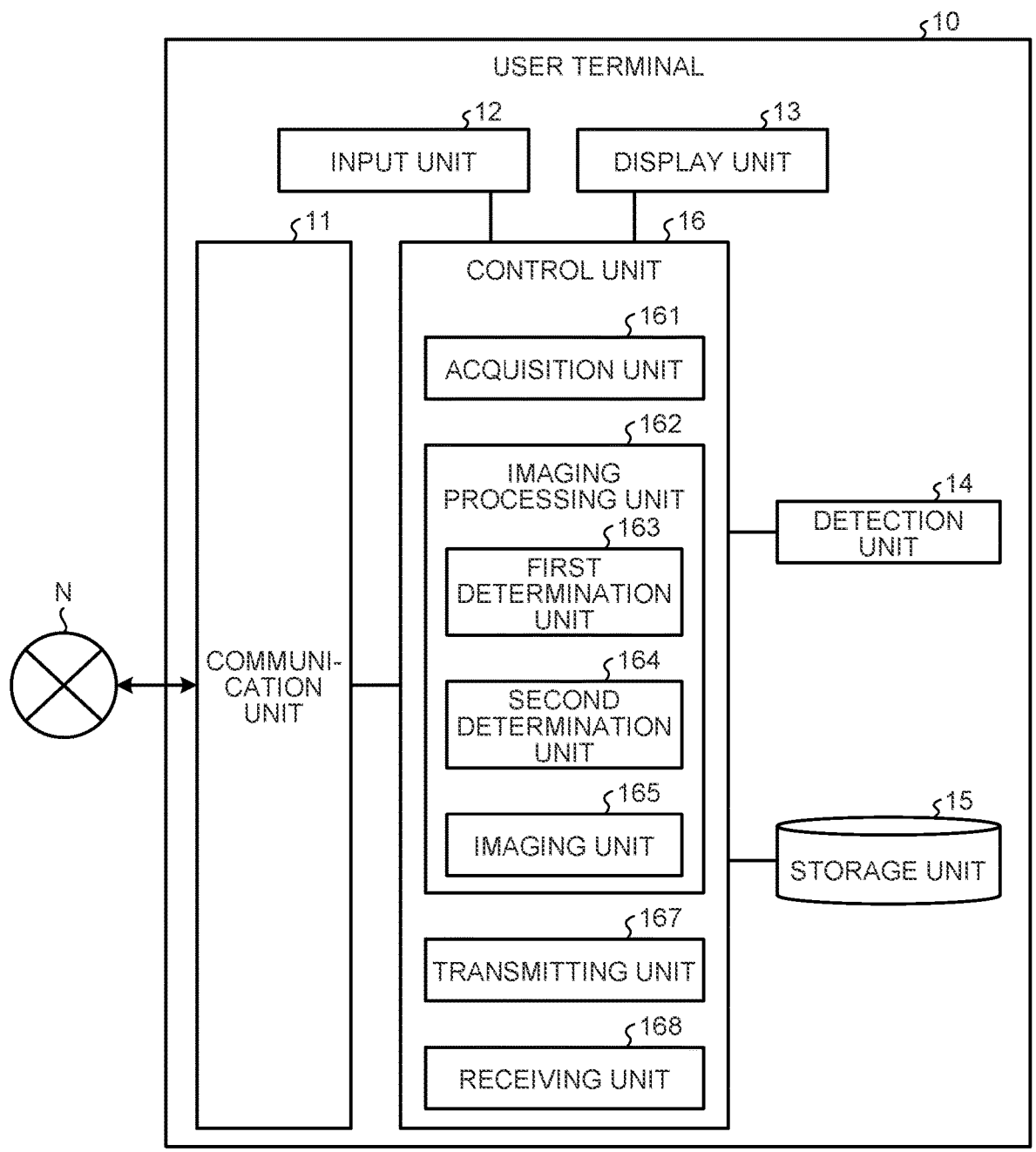
FIG. 3 is a diagram illustrating a configuration example of a user terminal according to an embodiment.

A configuration of the user terminal 10 which is an example of the information processing apparatus according to the present disclosure will be described with reference to FIG. 3. FIG. 3 is a diagram illustrating a configuration example of the user terminal 10 according to an embodiment. As illustrated in FIG. 3, the user terminal 10 includes a communication unit 11, an input unit 12, a display unit 13, a detection unit 14, a storage unit 15, and a control unit 16.

The communication unit 11 is actualized by Network Interface Card (NIC), for example. The communication unit 11 is connected to a network N (Internet, or the like) by wired or wireless communication, and transmits/receives information to/from the cloud server 100, a service server 200, a headphones 50, or the like, via the network N.

The input unit 12 is an input device that receives various operations from the user. For example, the input unit 12 is actualized by operation keys or the like provided on the user terminal 10. The display unit 13 is a display device for displaying various types of information. For example, the display unit 13 is actualized by a liquid crystal display or the like. When a touch panel is adopted for the user terminal 10, a part of the input unit 12 and the display unit 13 are integrated.

The detection unit 14 is a general term for various sensors, and detects various types of information related to the user terminal 10. Specifically, the detection unit 14 detects the user's operation on the user terminal 10, the position information of the user terminal 10, information related to devices connected to the user terminal 10, the environment in the user terminal 10, or the like.

Furthermore, as an example of a sensor, the detection unit 14 has a lens and an image sensor for performing imaging. That is, the detection unit 14 exhibits a function as a camera, for example, when the user has started an application that activates an imaging function.

In addition, the detection unit 14 detects information related to the environment by using various sensors and functions provided in the user terminal 10. For example, the detection unit 14 utilizes a microphone that collects sounds around the user terminal 10, an illuminance sensor that detects the illuminance around the user terminal 10, an acceleration sensor (or a gyro sensor) or a speed sensor that detects the physical movement of the user terminal 10, a geomagnetic sensor that detects the magnetic field at the location of the user terminal 10, or the like. The detection unit 14 detects various types of information by using various sensors.

The storage unit 15 is implemented by semiconductor memory elements such as Random Access Memory (RAM) and memory in the form of flash drives, or other storage devices such as a hard disk or an optical disk. The storage unit 15 stores various types of data used for information processing.

For example, the storage unit 15 stores a captured image or the like acquired by using the camera function. In addition, the storage unit 15 stores information regarding the HRTF generated by the cloud server 100. Furthermore, the storage unit 15 may store a model that has undergone image recognition training for recognizing the user's front-view face, a model that has undergone image recognition training for recognizing the user's side-view face or the user's ear, or the like.

The control unit 16 is implemented by execution of a program (for example, an information processing program according to the present disclosure) stored in the user terminal 10 by a Central Processing Unit (CPU), a Micro Processing Unit (MPU), a Graphics Processing Unit (GPU), or the like, by using Random Access Memory (RAM) or the like, as a work area. In addition, the control unit 16 is a controller and may be implemented by an integrated circuit such as an application specific integrated circuit (ASIC) or a field programmable gate array (FPGA).

As illustrated in FIG. 3, the control unit 16 includes an acquisition unit 161, an imaging processing unit 162, and a transmitting unit 167, and a receiving unit 168, and actualizes or executes information processing functions or operations described below. The internal configuration of the control unit 16 is not limited to the configuration illustrated in FIG. 3, and may be another configuration as long as it is a configuration that performs information processing described below.

The acquisition unit 161 acquires various types of information. For example, the acquisition unit 161 acquires information detected by the detection unit 14. The acquisition unit 161 stores the acquired information in the storage unit 15 as appropriate.

The imaging processing unit 162 controls the imaging process of the image used to generate the personalized HRTF. The imaging processing unit 162 includes a first determination unit 163, a second determination unit 164, and an imaging unit 165, in which each of the processing units cooperates to execute imaging processing of an image.

The first determination unit 163 determines whether the size of the region occupied by the user's front-view face in an imaging region is within a threshold.

The first determination unit 163 sets a first guide region for specifying the region occupied by the user's front-view face in the imaging region, and determines whether the size of the region occupied by the user's front-view face with respect to the first guide region is within a threshold. The first guide region corresponds to the inner portion of the guide frame 22 illustrated in FIG. 2, for example. By setting the first guide region, the first determination unit 163 can give the user intuitive understanding as to what size and position of the face are to be used when the face is captured by the camera.

Specifically, the first determination unit 163 determines whether the region extracted as the user's front-view face is included in the imaging region. The region extracted as the user's front-view face is a region recognized as a front-view face by using an arbitrary image recognition model, for example. The region extracted as the user's front-view face of is represented by a rectangle of a predetermined size, for example.

For example, based on the ratio at which the region extracted as the user's front-view face is included in the imaging region, the first determination unit 163 determines whether the region extracted as the user's front-view face is included in the imaging region.

In addition, the first determination unit 163 may determine whether the region extracted as the user's front-view face is included in the imaging region based on a distance between an end of the region extracted as the user's front-view face and an end of the imaging region.

Figure 4:
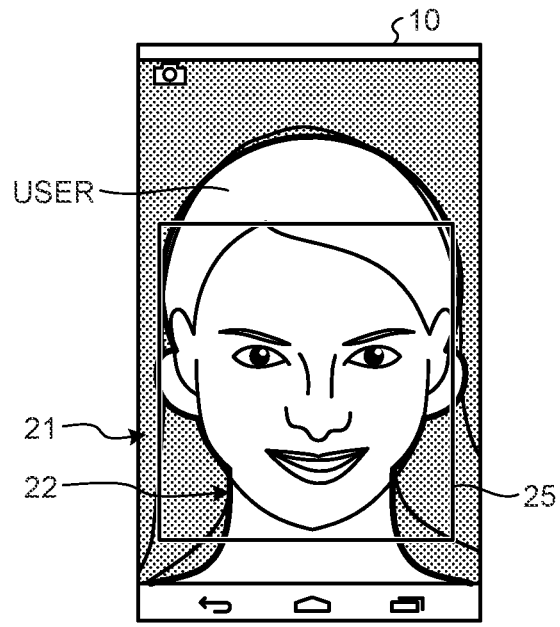
FIG. 4 is a diagram illustrating a first determination process according to an embodiment.

Processes executed by the first determination unit 163 will be described with reference to FIG. 4. FIG. 4 is a diagram illustrating a first determination process according to an embodiment.

As illustrated in FIG. 4, when the first determination unit 163 performs image recognition on the front-view face of the user, the first determination unit 163 extracts a region 25 as a front-view face of the user. The first determination unit 163 determines whether the region occupied by the region 25 is within a threshold (for example, more than 60% and not more than 90%) with respect to the imaging region 21 or the first guide region (inner portion of the guide frame 22) so as to determine whether the user's front-view face is included in the imaging region 21. The threshold may be changed as appropriate in response to a request from the cloud server 100, for example.

Furthermore, the first determination unit 163 determines the distance between the end of the region 25 and the end of the imaging region 21. For example, the first determination unit 163 detects the number of picture elements (number of pixels) included between the end of the region 25 and the end of the imaging region 21. In a case where the number of picture elements exceeding a predetermined number exists, the first determination unit 163 determines that the region 25 is included in the imaging region 21.

With the above process, the first determination unit 163 can determine the states in which the size of the user's face is extremely small or large or the position of the user's face is out of the imaging region of the camera.

In FIG. 4, although the region 25 extracted as the front-view face of the user is represented by a rectangle, the shape is not to be limited to rectangle, and the first determination unit 163 may extract the region 25 as a shape along the front-view face of the user. In addition, the region 25 may be but need not be displayed on the screen and presented to the user.

In a case where the first determination unit 163 has determined that the size of the region occupied by the front-view face of the user is within the threshold, the first determination unit 163 outputs a response to the effect that the process will proceed to the imaging of the side-view face of the user. With this procedure, the first determination unit 163 can proceed to side-view imaging after adjusting the positional relationship between the user and the user terminal 10 (imaging device) to an appropriate relationship.

Specifically, the first determination unit 163 outputs at least one of voice, vibration, or display of a character string, as the response. For example, the first determination unit 163 uses a TTS function and outputs a voice prompting the user to turn to the right or left in order to perform the side-view imaging. Alternatively, the first determination unit 163 may output a sound effect indicating that the determination of the front-view face is successful, or may vibrate the user terminal 10 to notify the user of completion of the determination of the front-view face.

Furthermore, in a case where the first determination unit 163 has determined that the size of the region occupied by the user's front-view face is not within the threshold, the first determination unit 163 may output a response to the effect that the position of the user's face should be moved or the position of the device used for imaging of the user should be moved.

Also in this case, the first determination unit 163 outputs at least one of voice, vibration, or display of a character string, as the response. For example, the first determination unit 163 uses a TTS function and outputs a voice prompting the user to make the distance between the user and the user terminal 10 closer or talk, or to move the position of the user or the user terminal 10 to the right or left.

In a case where the first determination unit 163 has determined that the size of the region occupied by the user's front-view face is within the threshold, the second determination unit 164 determines whether the region occupied by the user's side-view face in the imaging region is within a threshold.

The second determination unit 164 may set a second guide region for specifying the region occupied by the user's side-view face in the imaging region, and may determine whether the size of the region occupied by the user's side-view face with respect to the second guide region is within a threshold. The second guide region corresponds to an inner portion of the guide frame 23 illustrated in FIG. 2, for example. By setting the second guide region, the second determination unit 164 can give the user intuitive understanding as to what size and position of the face are to be used when the face is captured by the camera.

The second determination unit 164 determines whether a region including the user's ear out of the region extracted as the user's side-view face, is included in the imaging region. In a case where the region including the user's ear is included in the imaging region, the second determination unit 164 determines that the size of the region occupied by the user's side-view face is within a threshold.

Specifically, the second determination unit 164 determines whether the region including the user's ear is included in the imaging region based on the ratio at which the region including the user's ear is included in the imaging region.

Alternatively, the second determination unit 164 may determine whether the region including the user's ear is included in the imaging region based on a ratio of the region including the user's ear to the region occupied by the user's side-view face.

Furthermore, the second determination unit 164 may determine whether the region including the user's ear is included in the imaging region based on a distance between an end of the region including the user's ear and an end of the imaging region.

Figure 5:
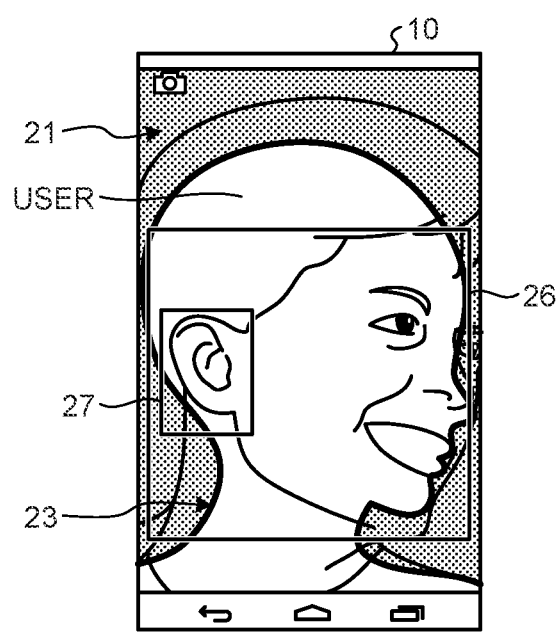
FIG. 5 is a diagram illustrating a second determination process according to an embodiment.

Processes executed by the second determination unit 164 will be described with reference to FIG. 5. FIG. 5 is a diagram illustrating a second determination process according to an embodiment.

As illustrated in FIG. 5, when the second determination unit 164 performs image recognition on the front-view face of the user, the second determination unit 164 extracts a region 26 as a side-view face of the user. The second determination unit 164 determines whether the region occupied by the region 26 is within a threshold with respect to the imaging region 21 or the second guide region (inner portion of the guide frame 23) so as to determine whether the user's side-view face is included in the imaging region 21. The threshold may be changed as appropriate in response to a request from the cloud server 100, for example.

Alternatively, the second determination unit 164 may determine whether the region including the user's ear is included in the imaging region based on the ratio of the region 27 including the user's ear to the region 26 occupied by the user's side-view face. This is because the ratio of the ear size to the head size in the side-view of the user in the image used to generate HRTF influences the accuracy of the HRTFs to be generated. By such processing, the second determination unit 164 can capture an image in which the size of the user's head and the size of the ear have an appropriate relationship.

Furthermore, the second determination unit 164 may determine the distance between the end of the region 27 indicating the ear and the end of the imaging region 21. For example, the second determination unit 164 detects the number of picture elements (number of pixels) included between the end of the region 27 and the end of the imaging region 21. In a case where the number of picture elements exceeding a predetermined number exists, the second determination unit 164 determines that the region 27 is included in the imaging region 21.

By the above processes, the second determination unit 164 can prevent the capture of an image that does not include an ear, making it possible to reduce the burden on the user caused by repetition of imaging.

In FIG. 4, although the region 26 extracted as the side-view face of the user or the region 27 including the user's ear is represented by a rectangle, the shape is not to be limited to rectangle, and the second determination unit 164 may extract the region 26 or 27 as a shape along the side-view face of the user or the ear. In addition, the region 26 or the region 27 may be but need not be displayed on the screen and presented to the user.

Furthermore, in a case where the second determination unit 164 has determined that the region including the user's ear, out of the region extracted as the side-view face of the user, is not included in the imaging region, the second determination unit 164 may output a response to the effect that the position of the user's face should be moved or the position of the device used for imaging of the user should be moved.

Specifically, the second determination unit 164 outputs at least one of voice, vibration, or display of a character string, as the response. For example, by making a response in a mode that is easy for the user to understand without viewing the screen, such as voice or vibration, the second determination unit 164 can notify the user in an easy-to-understand manner whether the imaging is being properly performed.

In a case where the second determination unit 164 has determined that the size of the region occupied by the side-view face of the user is within the threshold, the imaging unit 165 images the side-view face of the user. The imaging unit 165 can perform imaging at an appropriate timing by automatically performing imaging in response to a determination result of the second determination unit 164 without making a determination of the shutter button depression performed by the user.

Furthermore, the imaging unit 165 may image the side-view face of the user in a case where the second determination unit 164 has determined that the size of the region occupied by the user's side-view face is within the threshold and thereafter the imaging unit 165 has determined that the amount of behavior of the device used for the user's imaging is within a threshold. In the embodiment, the device used for imaging the user refers to the user terminal 10. That is, the imaging unit 165 performs imaging in a case where it has received a determination result by the second determination unit 164 and then the imaging unit 165 has determined that the amount of behavior (acceleration, speed, etc.) of the user terminal 10 is within a threshold. With this procedure, the imaging unit 165 can prevent the capture of a blurred image.

Furthermore, the imaging unit 165 may image the side-view face of the user in a case where the second determination unit 164 has determined that the size of the region occupied by the user's side-view face is within a threshold and thereafter the imaging unit 165 has determined that the amount of movement of the side-view face of the user in the imaging region is within a threshold.

That is, the imaging unit 165 compares an image at the timing when the determination result by the second determination unit 164 is received with an image at the next imaging interval, for example, an image after a predetermined number of frames, and determines that the amount of movement of the user's face or ear is a threshold or less. Such processing can be performed by applying tracking processing of an object in an image, for example. By performing imaging in a case where there has been a determination that the amount of movement of the user is within a threshold, the imaging unit 165 can prevent the capture of a blurred image.

Furthermore, the imaging unit 165 may edit the captured image and perform preprocessing on the image before being transmitted to the cloud server 100. For example, the imaging unit 165 may edit so that the region including the user's ear is in the center of the image. Alternatively, the imaging unit 165 may trim a region outside a predetermined range centering on the region including the user's ear.

The transmitting unit 167 transmits various types of information. For example, the transmitting unit 167 transmits the image captured by the imaging unit 165 to the cloud server 100.

The receiving unit 168 receives various types of information. For example, receiving unit 168 receives personalized HRTFs generated by the cloud server 100.

[1-3. Configuration of Cloud Server According to an Embodiment]

Figure 6:
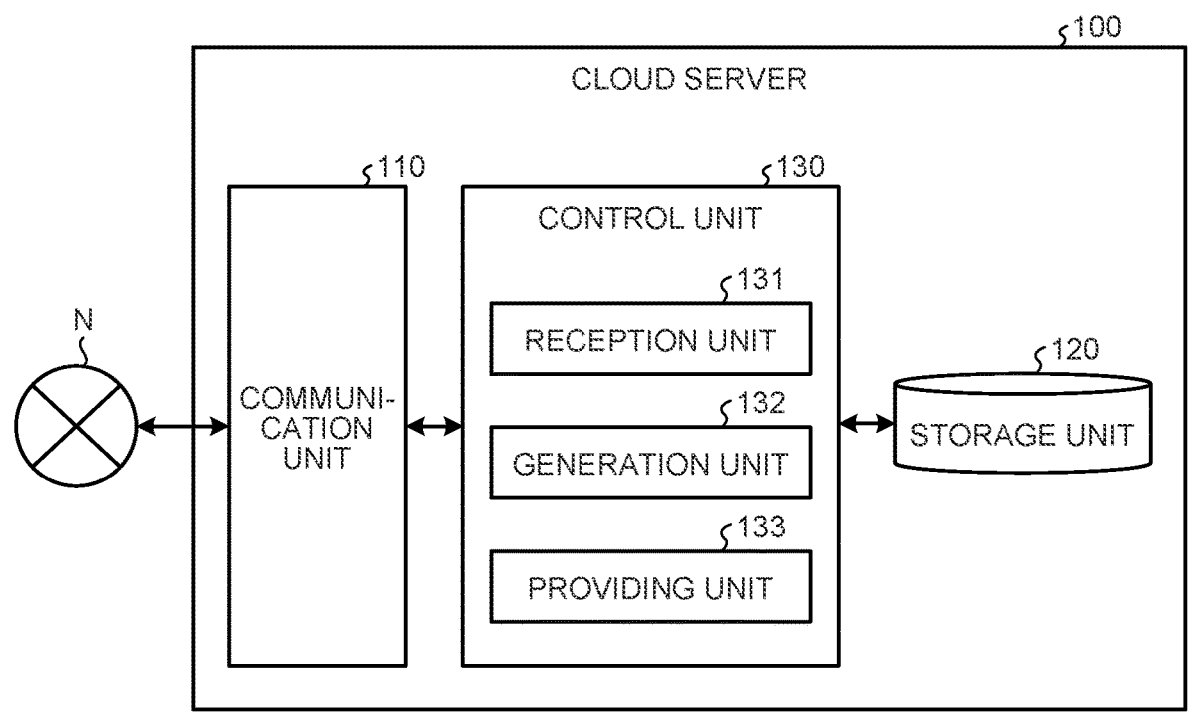
FIG. 6 is a diagram illustrating a configuration example of a cloud server according to an embodiment.

Next, a configuration of the cloud server 100 according to an embodiment will be described with reference to FIG. 6. FIG. 6 is a diagram illustrating a configuration example of the cloud server 100 according to an embodiment.

As illustrated in FIG. 6, the cloud server 100 includes a communication unit 110, a storage unit 120, and a control unit 130. The cloud server 100 may include an input unit (for example, a keyboard, a mouse, etc.) that receives various operations from an administrator or the like that manages the cloud server 100, and a display unit (for example, a liquid crystal display, etc.) for displaying various types of information.

The communication unit 110 is implemented by a NIC, for example. The communication unit 110 is connected to a network N (Internet, or the like) by wired or wireless connection, and transmits/receives information to/from the user terminal 10 or the like, via the network N.

The storage unit 120 is implemented by semiconductor memory elements such as random access memory (RAM) and flash drives, or storage devices such as a hard disk or an optical disk. For example, the storage unit 120 stores an image acquired from the user terminal 10 and a model to be used for generating (calculating) a HRTF (for example, a trained model trained to output an HRTF by inputting an image).

The control unit 130 is actualized by execution of a program stored in the cloud server 100 by the CPU, MPU, GPU, or the like, with RAM or the like used as a work area. Furthermore, the control unit 130 may be a controller and may be actualized by using an integrated circuit such as an ASIC or an FPGA, for example.

As illustrated in FIG. 6, the control unit 130 includes a reception unit 131, a generation unit 132, and a providing unit 133, and actualizes or executes information processing functions or operations described below. The internal configuration of the control unit 130 is not limited to the configuration illustrated in FIG. 6, and may be another configuration as long as it is a configuration that performs information processing described below.

The reception unit 131 receives various types of information. For example, the reception unit 131 receives a request for a HRTF generation process from the user terminal 10. The reception unit 131 further receives an image used for the HRTF generation process from the user terminal 10.

Based on an image received by the reception unit 131, the generation unit 132 generates a personalized HRTF corresponding to the image. For example, the generation unit 132 generates a personalized HRTF using a trained model trained to take an image as input and output an HRTF. The trained model is not specified by a specific type. For example, the generation unit 132 may generate a personalized HRTF by using a variety of models generated by using various learning algorithms such as a neural network, a support vector machine, clustering, and reinforcement learning.

The generation unit 132 may transmit parameters related to the imaging process performed by the user terminal 10 to the user terminal 10. For example, the generation unit 132 transmits parameters such as information specifying the size of the ears included in the image (for example, "an image in which the region including the ear has a size of approximately 200×200 pixels"), acceleration and speed of the user terminal 10 which are allowed in the imaging, or the amount of movement of the user.

The providing unit 133 provides the personalized HRTF generated by the generation unit 132 to the user terminal 10. In a case where the personalized HRTF cannot be generated based on the image received from the user terminal 10, the providing unit 133 may provide error information or the like.

[1-4. Procedure of Information Processing According to an Embodiment]

Figure 7:
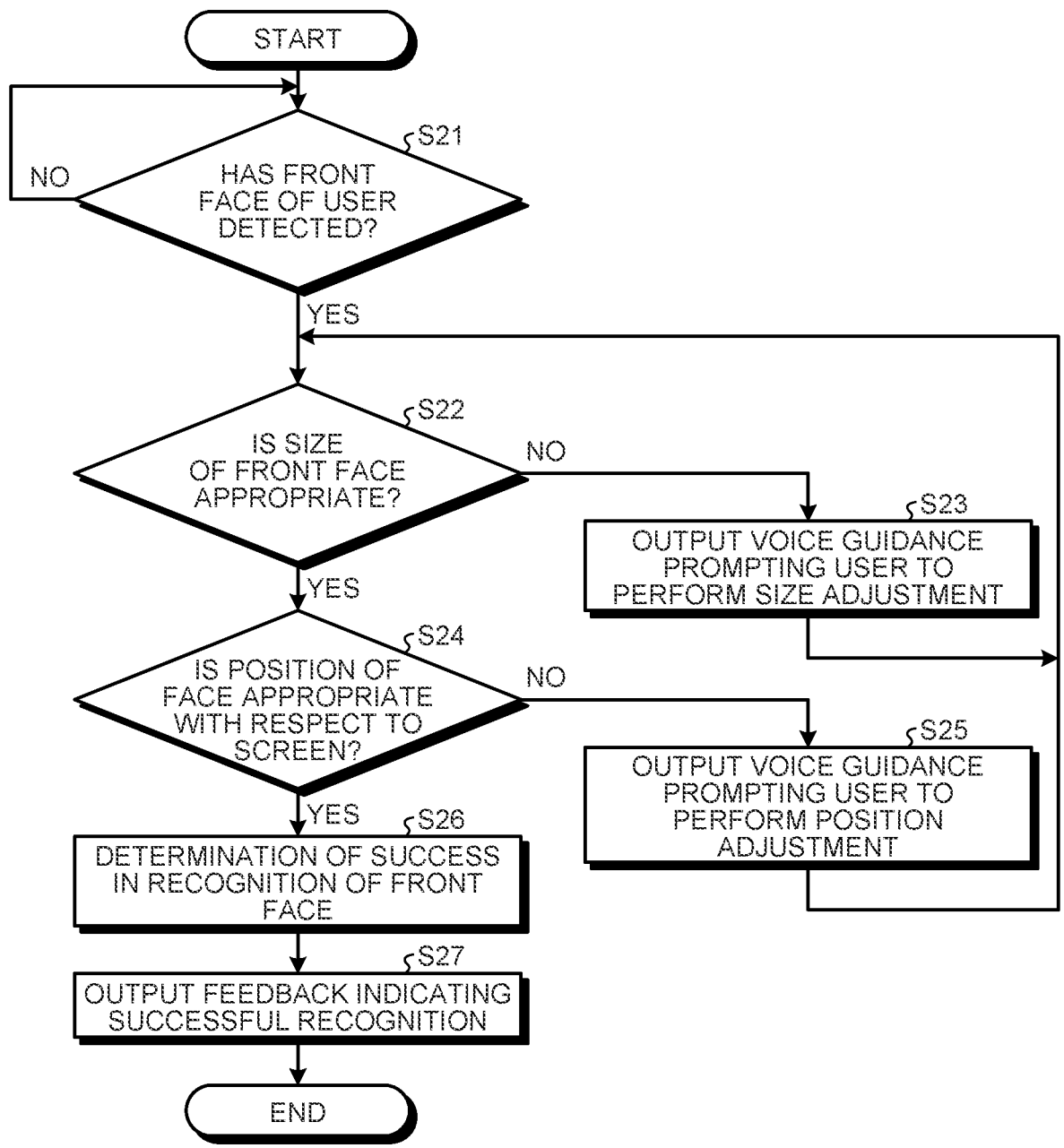
FIG. 7 is a flowchart (1) illustrating a procedure of information processing according to an embodiment.

Next, an information processing procedure according to an embodiment will be described with reference to FIGS. 7 and 8. FIG. 7 illustrates a processing procedure of the first determination process executed by the user terminal 10. FIG. 7 is a flowchart (1) illustrating a flow of information processing according to an embodiment.

As illustrated in FIG. 7, the user terminal 10 determines whether the front face of the user is detected within a viewing angle of the camera function (Step S21). In a case where the front face of the user is not detected (Step S21; No), the user terminal 10 waits until the front face of the user is detected.

In contrast, in a case where the front face of the user is detected (Step S21; Yes), the user terminal 10 determines whether the size of the front face is appropriate in the imaging region (Step S22).

In a case where the size of the front face is not appropriate (Step S22; No), the user terminal 10 outputs a response such as voice guidance prompting the user to adjust the size (Step S23).

In a case where the size of the front face of the user is appropriate (Step S22; Yes), the user terminal 10 determines whether the position of the face is appropriate with respect to the screen (Step S24).

In a case where the position of the front face is not appropriate (Step S24; No), the user terminal 10 outputs a response such as voice guidance prompting the user to adjust the position (Step S25).

In a case where the position of the front face of the user is appropriate (Step S24; Yes), the user terminal 10 determines that the recognition of the front face of the user is successful (Step S26). Subsequently, the user terminal 10 outputs feedback (voice, vibration, or the like) indicating that the recognition is successful (Step S27).

Next, a procedure of the process in which the user terminal 10 images the user's ear will be described with reference to FIG. 8. FIG. 8 is a flowchart (2) illustrating a flow of information processing according to an embodiment.

Figure 8:
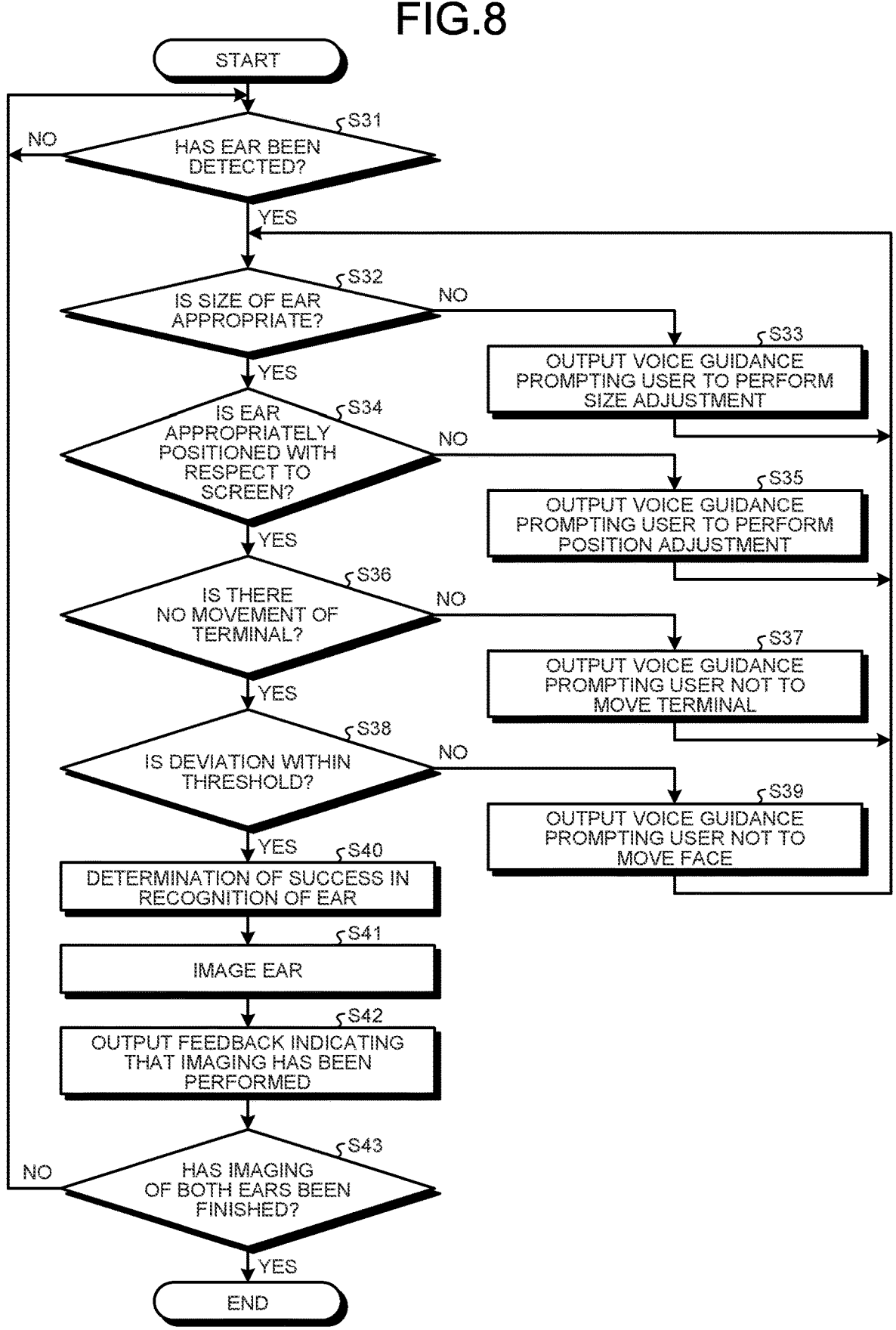
FIG. 8 is a flowchart (2) illustrating a procedure of information processing according to an embodiment.

As illustrated in FIG. 8, the user terminal 10 determines whether the ear (side face) of the user is detected within a viewing angle of the camera function (Step S31). In a case where the ear of the user is not detected (Step S31; No), the user terminal 10 waits until the ear of the user is detected.

In contrast, in a case where the ear of the user is detected (Step S31; Yes), the user terminal 10 determines whether the size of the ear is appropriate in the imaging region (Step S32).

In a case where the size of the ear is not appropriate (Step S32; No), the user terminal 10 outputs a response such as voice guidance prompting the user to adjust the size (Step S33).

In a case where the size of the ear of the user is appropriate (Step S32; Yes), the user terminal 10 determines whether the position of the ear is appropriate with respect to the screen (Step S34).

In a case where the position of the ear is not appropriate (Step S34; No), the user terminal 10 outputs a response such as voice guidance prompting the user to adjust the position of the ear (Step S35).

In a case where the position of the user's ear is appropriate (Step S34; Yes), the user terminal 10 determines whether there is no movement of the user terminal 10 beyond a threshold (Step S36).

In a case where there is a movement of the user terminal 10 beyond the threshold (Step S36; No), the user terminal 10 outputs a response such as a voice guidance prompting the user not to move the user terminal 10 (Step S37).

In a case where there is no movement of the user terminal 10 beyond the threshold (Step S36; Yes), the user terminal 10 determines whether the deviation of the position of the user's ear or head is within a threshold in frames to be imaged (Step S38).

In a case where the deviation is not within the threshold (Step S38; No), the user terminal 10 outputs a response such as a voice guidance prompting the user not to move the face (Step S39).

When the deviation is within the threshold (Step S38; Yes), the user terminal 10 determines that the ear recognition is successful (Step S40). Subsequently, the user terminal 10 images the user's ear and acquires the captured image (Step S41).

Thereafter, the user terminal 10 outputs feedback to the user indicating that the ear has been imaged (Step S42). The user terminal 10 determines whether the imaging of both ears is completed (Step S43). In a case where both ears have not been imaged, that is, where only one ear has been imaged (Step S43; No), the user terminal 10 repeats the process of detecting the other ear (Step S31). In contrast, in a case where the imaging of both ears is completed (Step S43; Yes), the user terminal 10 ends the imaging process.

2. Modification

The information processing system 1 described above may be implemented in various different forms other than the above-described embodiment. Therefore, a modification of the embodiment will be described below.

In the embodiment, an example is illustrated in which the cloud server 100 generates a personalized HRTF. Alternatively, however, the personalized HRTF may be generated by the user terminal 10 instead of the cloud server 100. In this case, the user terminal 10 includes a processing unit similar to the generation unit 132 illustrated in FIG. 6.

Although the embodiment has assumed that the cloud server 100 is installed on a cloud network, the present invention is not limited to this example. The cloud server 100 may be installed on a Local Area Network (LAN) or the like as long as it can communicate with the user terminal 10.

In generating the personalized HRTF, the cloud server 100 may acquire the user's identification information and may hold the personalized HRTF in a manner in which the identification information and the personalized HRTF are associated with each other.

In the embodiment, the cloud server 100 is described as one server, but the cloud server 100 may include a plurality of server devices. For example, the cloud server 100 may be divided into a generation server that generates a personalized HRTF and a providing server that provides a personalized HRTF.

While the embodiment has described an example in which the user terminal 10 images the user, imaging may be performed by another imaging device. In this case, the imaging device sequentially transmits the information of the image to be captured to the user terminal 10. Subsequently, by recognizing the positions of the user's face and ear in the received image, the user terminal 10 executes the information processing according to the embodiment. Furthermore, while the embodiment has described that the user terminal 10 performs the process of determining the size of the side-view face of the user, the user terminal 10 may skip the process of determining the size of the face and may determine the size of the ear alone. That is, rather than first determining the size of the side-view face of the user and thereafter determining the size and position of the ear, the user terminal 10 may directly determine the suitability of the size and position of the user's ear, when possible.

The user terminal 10 may set a tolerance for the amount of light of the image to be captured or for the inclination of the ear, or the like, following the designation from the cloud server 100. This enables the user terminal 10 to reduce the probability of having from the cloud server 100 an error that the personalized HRTF cannot be generated from the captured image.

3. Other Embodiments

The process according to each of embodiments described above may be performed in various different forms (modifications) in addition to each of embodiments described above.

Furthermore, among each process described in the above embodiments, all or a part of the processes described as being performed automatically may be manually performed, or the processes described as being performed manually can be performed automatically by a known method. In addition, the processing procedures, specific names, and information including various data and parameters illustrated in the above specifications or drawings can be changed in any manner unless otherwise specified. For example, various types of information illustrated in each of drawings are not limited to the information illustrated.

In addition, each of components of each of devices is provided as a functional and conceptional illustration and thus does not necessarily need to be physically configured as illustrated. That is, the specific form of distribution/integration of each of devices is not limited to those illustrated in the drawings, and all or a part thereof may be functionally or physically distributed or integrated into arbitrary units according to various loads and use conditions.

Furthermore, the above-described embodiments and modifications can be appropriately combined within a range implementable without contradiction of processes.

The effects described in the present specification are merely examples, and thus, there may be other effects, not limited to the exemplified effects.

4. Effects of Information Processing Apparatus According to the Present Disclosure As described above, the information processing apparatus (user terminal 10 in the embodiment) according to the present disclosure includes a first determination unit (first determination unit 163 in the embodiment), a second determination unit (second determination unit 164 in the embodiment), and an imaging unit (imaging unit 165 in the embodiment). The first determination unit determines whether the size of the region occupied by the front-view face of the user in an imaging region is within a threshold. In a case where there has been a determination that the size of the region occupied by the user's front-view face is within the threshold, the second determination unit determines whether the region occupied by the user's side-view face in the imaging region is within a threshold. In a case where there has been a determination that the size of the region occupied by the side-view face of the user is within a threshold, the imaging unit images the side-view face of the user.

In this manner, the information processing apparatus according to the present disclosure first performs positioning with the front-view face so as to allow the user to obtain a self view with better visibility and thereafter images the side view of the user's head. This enables the information processing apparatus to reduce the probability of imaging failure and reduce the labor and burden on the user, making it possible to improve the convenience of the user regarding the imaging performed to calculate the head-related transfer function.

In addition, the first determination unit sets a first guide region for specifying the region occupied by the user's front-view face in the imaging region, and determines whether the size of the region occupied by the user's front-view face with respect to the first guide region is within a threshold. This allows the information processing apparatus to give the user intuitive understanding as to what size and position of the face should be captured by the camera.

Furthermore, the first determination unit determines whether the region extracted as the front-view face of the user is included in the imaging region. With this configuration, the information processing apparatus can execute the imaging process after confirming that the user is located at a position suitable for imaging, making is possible to reduce imaging failures.

Furthermore, the first determination unit determines whether the region extracted as the user's front-view face is included in the imaging region based on the ratio at which the region extracted as the user's front-view face is included in the imaging region. With this configuration, the information processing apparatus can accurately grasp information regarding how far or close the position of the user is, making it possible to perform imaging smoothly.

In addition, the first determination unit determines whether the region extracted as the user's front-view face is included in the imaging region based on a distance between an end of the region extracted as the user's front-view face and an end of the imaging region. With this configuration, the information processing apparatus can accurately grasp information regarding whether the position of the user is within or outside the imaging region, making it possible to perform imaging smoothly.

In a case where the first determination unit has determined that the size of the region occupied by the front-view face of the user is within the threshold, the first determination unit outputs a response to the effect that the process will proceed to the imaging of the side-view face of the user. With this configuration, the information processing apparatus can capture a side-view image after confirming that the user has performed accurate positioning with the front view, making it possible to enhance the success rate of imaging.

Furthermore, in a case where the first determination unit has determined that the size of the region occupied by the user's front-view face is not within the threshold, the first determination unit outputs a response to the effect that the position of the user's face should be moved or the position of the device used for imaging of the user should be moved. With this configuration, the information processing apparatus can give an appropriate response to the user, enabling imaging to be performed precisely and quickly.

In addition, the first determination unit outputs at least one of voice, vibration, or display of a character string, as the response. The voice is not limited to the message voice by TTS, and may include a sound effect such as a shutter sound. With this output, the information processing apparatus can give the user a response in various modes, making it possible to precisely notify the user of necessary information.

In addition, the second determination unit sets a second guide region for specifying the region occupied by the user's side-view face in the imaging region, and determines whether the size of the region occupied by the user's side-view face with respect to the second guide region is within a threshold. This allows the information processing apparatus to give the user intuitive understanding as to what size and position of the face should be captured by the camera.

Furthermore, the second determination unit determines whether the region including the user's ear out of the region extracted as the user's side-view face, is included in the imaging region. In a case where the region including the user's ear is included in the imaging region, the second determination unit determines that the size of the region occupied by the user's side-view face is within a threshold. With this configuration, the information processing apparatus can surely include the ear in the image to be captured, making it possible to acquire an image suitable for the generation process of the personalized HRTF.

In addition, the second determination unit determines whether the region including the user's ear is included in the imaging region based on the ratio at which the region including the user's ear is included in the imaging region. With this, the information processing apparatus can acquire an image including an ear having a size suitable for the generation process of the personalized HRTF.

Alternatively, the second determination unit determines whether the region including the user's ear is included in the imaging region based on the ratio of the region including the user's ear to the region occupied by the user's side-view face. With this, the information processing apparatus can acquire an image in which the size of the user's head and the size of the ear have a suitable relationship in HRTF generation.

Furthermore, the second determination unit determines whether the region including the user's ear is included in the imaging region based on a distance between an end of the region including the user's ear and an end of the imaging region. With this, the information processing apparatus can prevent the capture of an image that disables HRTF generation because the ear is located at the end of the image.

Furthermore, in a case where the second determination unit has determined that the region including the user's ear, out of the region extracted as the side-view face of the user, is not included in the imaging region, the second determination unit outputs a response to the effect that the position of the user's face should be moved or the position of the device used for imaging of the user should be moved. With this configuration, the information processing apparatus can give an appropriate response to the user, enabling imaging to be performed precisely and quickly.

In addition, the second determination unit outputs at least one of voice, vibration, or display of a character string, as the response. With this, the information processing apparatus can notify the user of an appropriate response even when the user cannot view the screen.

Furthermore, the imaging unit images the side-view face of the user in a case where there has been a determination that the size of the region occupied by the user's side-view face is within the threshold and thereafter the imaging unit has determined that the amount of behavior of the device used for the user's imaging is within a threshold. With this procedure, the information processing apparatus can prevent the capture of a blurred image.

Furthermore, the imaging unit images the side-view face of the user in a case where there has been a determination that the size of the region occupied by the user's side-view face is within the threshold and thereafter the imaging unit has determined that the amount of movement of the side-view face of the user in the imaging region is within a threshold. With this procedure, the information processing apparatus can prevent the capture of a blurred image.

5. Hardware Configuration

Figure 9:
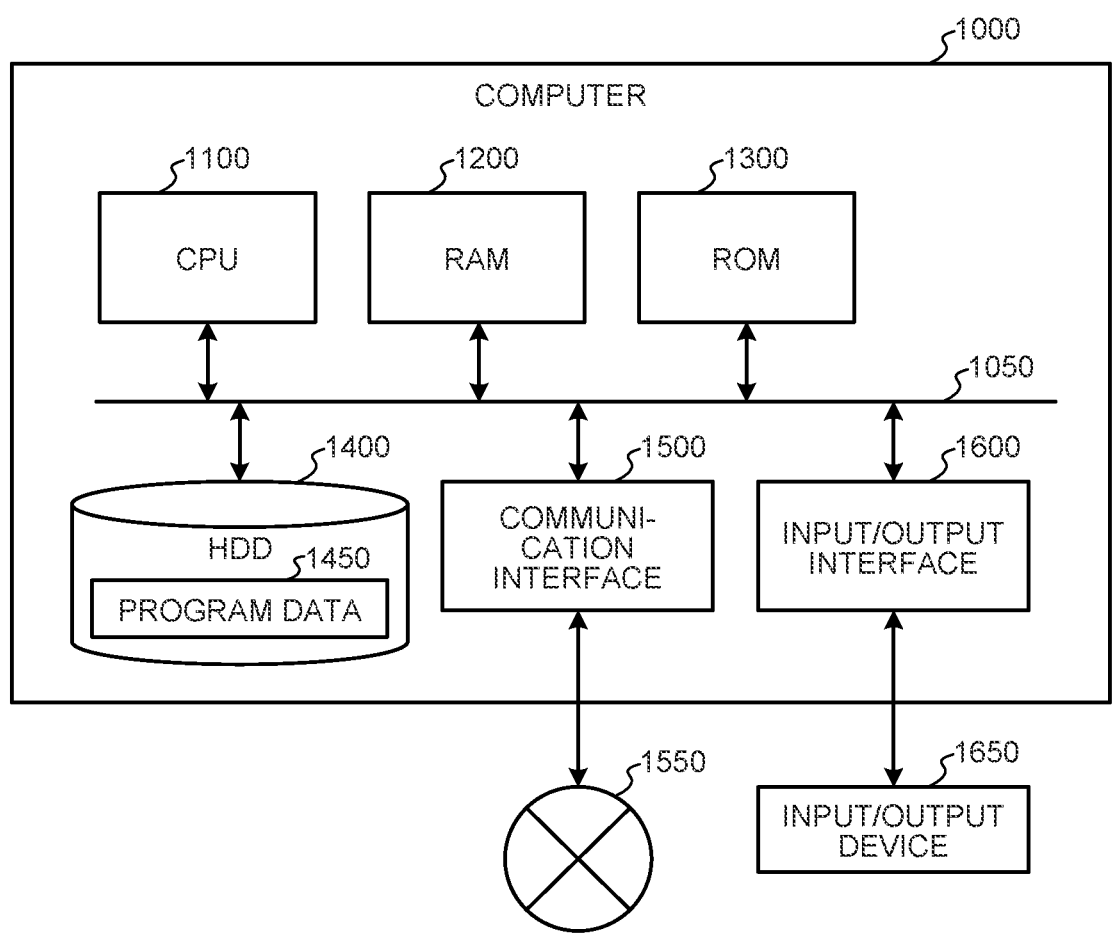
FIG. 9 is a hardware configuration diagram illustrating an example of a computer that actualizes functions of an information processing apparatus.

The information devices such as the user terminal 10 and the cloud server 100 according to the above-described embodiments are implemented by a computer 1000 having a configuration as illustrated in FIG. 9, for example. Hereinafter, the user terminal 10 according to an embodiment will be described as an example. FIG. 9 is a hardware configuration diagram illustrating an example of the computer 1000 that implements the functions of the user terminal 10. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops a program stored in the ROM 1300 or the HDD 1400 into the RAM 1200 and executes processes corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording media. Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the user terminal 10 according to the embodiment, the CPU 1100 of the computer 1000 executes the information processing program loaded on the RAM 1200 to implement the functions of the control unit 16 or the like. Furthermore, the HDD 1400 stores the information processing program according to the present disclosure or data in the storage unit 15. While the CPU 1100 executes the program data 1450 read from the HDD 1400, the CPU 1100 may acquire these programs from another device via the external network 1550, as another example.

Note that the present technology can also have the following configurations.

(1)

An information processing apparatus comprising:
a first determination unit that determines whether a size of a region occupied by a user's front-view face in an imaging region is within a threshold;
a second determination unit that determines whether a size of a region occupied by a user's side-view face in the imaging region is within a threshold in a case where there has been a determination that the size of the region occupied by the user's front-view face is within the threshold; and
an imaging unit that images the user's side-view face in a case where there has been a determination that the size of the region occupied by the user's side-view face is within the threshold.

(2)

The information processing apparatus according (1),
wherein the first determination unit
sets a first guide region for specifying the region occupied by the user's front-view face in the imaging region, and determines whether the size of the region occupied by the user's front-view face with respect to the first guide region is within a threshold.

(3)

The information processing apparatus according (1) or (2),
wherein the first determination unit
determines whether the region extracted as the user's front-view face is included in the imaging region.

(4)

The information processing apparatus according to (3),
wherein the first determination unit
determines whether the region extracted as the user's front-view face is included in the imaging region based on a ratio at which the region extracted as the user's front-view face is included in the imaging region.

(5)

The information processing apparatus according to (3) or (4),
wherein the first determination unit
determines whether the region extracted as the user's front-view face is included in the imaging region based on a distance between an end of the region extracted as the user's front-view face and an end of the imaging region.

(6)

The information processing apparatus according to any one of (1) to (5),
wherein in a case where the first determination unit has determined that the size of the region occupied by the user's front-view face is within the threshold, the first determination unit outputs a response to an effect that a process will proceed to imaging of the user's side-view face.

(7)

The information processing apparatus according to any one of (1) to (6),
wherein in a case where the first determination unit has determined that the size of the region occupied by the user's front-view face is not within the threshold, the first determination unit outputs a response to an effect that a position of the user's face should be moved or a position of a device used for imaging of the user should be moved.

(8)

The information processing apparatus according to (6) or (7),
wherein the first determination unit
outputs at least one of voice, vibration, or display of a character string, as the response.

(9)

The information processing apparatus according any one of (1) to (8),
wherein the second determination unit
sets a second guide region for specifying the region occupied by the user's side-view face in the imaging region, and determines whether the size of the region occupied by the user's side-view face with respect to the second guide region is within a threshold.

(10)

The information processing apparatus according to any one of (1) to (9),
wherein the second determination unit
determines whether a region including an ear of the user, out of the region extracted as the user's side-view face, is included in the imaging region, and determines that the size of the region occupied by the user's side-view face is within the threshold in a case where the region including the user's ear is included in the imaging region.

(11)

The information processing apparatus according to (10),
wherein the second determination unit
determines whether the region including the user's ear is included in the imaging region based on a ratio at which the region including the user's ear is included in the imaging region.

(12)

The information processing apparatus according to (10) or (11)
wherein the second determination unit
determines whether the region including the user's ear is included in the imaging region based on a ratio of the region including the user's ear to the region occupied by the user's side-view face.

(13)

The information processing apparatus according to any one of (10) to (12),
wherein the second determination unit
determines whether the region including the user's ear is included in the imaging region based on a distance between an end of the region including the user's ear and an end of the imaging region.

(14)

The information processing apparatus according to any one of (10) to (13),
wherein, in a case where the second determination unit has determined that the region including the user's ear, out of the region extracted as the side-view face of the user, is not included in the imaging region, the second determination unit outputs a response to an effect that a position of the user's face should be moved or a position of a device used for imaging of the user should be moved.

(15)

The information processing apparatus according to (14),
wherein the second determination unit
outputs at least one of voice, vibration, or display of a character string, as the response.

(16)

The information processing apparatus according to any one of (1) to (15),
wherein the imaging unit
images the user's side-view face in a case where there has been a determination that the size of the region occupied by the user's side-view face is within the threshold and thereafter the imaging unit has determined that an amount of behavior of a device used for the user's imaging is within a threshold.

(17)

The information processing apparatus according to any one of (1) to (16),
wherein the imaging unit
images the user's side-view face in a case where there has been a determination that the size of the region occupied by the user's side-view face is within the threshold and thereafter the imaging unit has determined that an amount of movement of the user's side-view face in the imaging region is within a threshold.

(18)

An information processing method comprising:
executing, by a computer, processes including:
determining whether a size of a region occupied by a user's front-view face in an imaging region is within a threshold;
determining whether a size of a region occupied by a user's side-view face in the imaging region is within a threshold in a case where there has been a determination that the size of the region occupied by the user's front-view face is within the threshold; and
imaging the user's side-view face in a case where there has been a determination that the size of the region occupied by the user's side-view face is within the threshold.

(19)

An information processing program for causing a computer to function as units comprising:
a first determination unit that determines whether a size of a region occupied by a user's front-view face in an imaging region is within a threshold;
a second determination unit that determines whether a size of a region occupied by a user's side-view face in the imaging region is within a threshold in a case where there has been a determination that the size of the region occupied by the user's front-view face is within the threshold; and
an imaging unit that images the user's side-view face in a case where there has been a determination that the size of the region occupied by the user's side-view face is within the threshold.

REFERENCE SIGNS LIST

1 INFORMATION PROCESSING SYSTEM
10 USER TERMINAL

11 COMMUNICATION UNIT
12 INPUT UNIT
13 DISPLAY UNIT
14 DETECTION UNIT
15 STORAGE UNIT
16 CONTROL UNIT
161 ACQUISITION UNIT
162 IMAGING PROCESSING UNIT
163 FIRST DETERMINATION UNIT
164 SECOND DETERMINATION UNIT
165 IMAGING UNIT
167 TRANSMITTING UNIT
168 RECEIVING UNIT
100 CLOUD SERVER

What is claimed is:

1. An information processing apparatus comprising:
circuitry configured to:
set a first guide region for specifying a region occupied by a user's front-view face in an imaging region;
in response to a determination that a size of the region occupied by the user's front-view face in the imaging region is within a first threshold, instruct the user to display the user's side-view face in the imaging region;
set a second guide region for specifying a region occupied by the user's side-view face in the imaging region, wherein the second guide region is different from the first guide region;
in response to a determination that a size of the region occupied by the user's side-view face in the imaging region is within a second threshold, determine whether the region occupied by the user's side-view face includes the user's ear based on at least one of:
a ratio at which a region including the user's ear is included in the imaging region, a ratio of the region including the user's ear to the region occupied by the user's side-view face, or a distance between an end of the region including the user's ear and an end of the imaging region; and
capture at least one image of the user's side-view face including an ear of the user and acquire data related to the at least one captured image automatically.

2. The information processing apparatus according claim 1, wherein the circuitry determines whether the size of the region occupied by the user's front-view face with respect to the first guide region is below the first threshold.

3. The information processing apparatus according claim 1, wherein the circuitry determines whether the region extracted as the user's front-view face is included in the imaging region.

4. The information processing apparatus according to claim 3, wherein the circuitry determines whether the region extracted as the user's front-view face is included in the imaging region based on a ratio at which the region extracted as the user's front-view face is included in the imaging region.

5. The information processing apparatus according to claim 3, wherein the circuitry determines whether the region extracted as the user's front-view face is included in the imaging region based on a distance between an end of the region extracted as the user's front-view face and an end of the imaging region.

6. The information processing apparatus according to claim 1, wherein in response to the size of the region occupied by the user's front-view face being below the first threshold, the circuitry outputs an indication that a process will proceed to imaging of the user's side-view face.

7. The information processing apparatus according to claim 1, wherein in response to the size of the region occupied by the user's front-view face not being below the first threshold, the circuitry outputs an indication that a position of the user's face should be moved or a position of a device used for imaging of the user should be moved.

8. The information processing apparatus according to claim 6, wherein the circuitry outputs at least one of voice, vibration, or display of a character string, as the indication.

9. The information processing apparatus according claim 1,
wherein the circuitry determines whether the size of the region occupied by the user's side-view face with respect to the second guide region is below a threshold.

10. The information processing apparatus according to claim 1, wherein the circuitry determines that the size of the region occupied by the user's side-view face is below the second threshold where the region including the user's ear is included in the imaging region.

11. The information processing apparatus according to claim 10, wherein, in response to the user's ear not being included in the region occupied by the user's side-view face, the circuitry outputs an indication that a position of the user's face should be moved or a position of a device used for imaging of the user should be moved.

12. The information processing apparatus according to claim 11, wherein the indication comprises at least one of voice, vibration, or display of a character string.

13. The information processing apparatus according to claim 1, wherein a head-related transfer function is calculated using a learned model in a server.

14. The information processing apparatus according to claim 1, further comprising circuitry configured to:
transmit the data related to the at least one captured image of the user to a server; and
receive a head-related transfer function of the user from the server.

15. The information processing apparatus according to claim 1, wherein in response to a determination that the size of the region occupied by the user's side-view face is within the second threshold, the circuitry is configured to determine that an amount of movement of a device used for the user's imaging is within a third threshold.

16. The information processing apparatus according to claim 15,
wherein in response to a determination that the amount of movement of the device used for the user's imaging is within the third threshold, the circuitry is configured to capture at least one image of the user's side-view face including the ear of the user automatically.

17. The information processing apparatus according to claim 1,
wherein in response to a determination that the size of the region occupied by the user's side-view face is within the second threshold, the circuitry is configured to determine that an amount of movement of the user's side-view face in the imaging region is within a third threshold.

18. The information processing apparatus according to claim 17,
wherein in response to a determination that the amount of movement of the user's side-view face in the imaging region is within the third threshold, the circuitry is configured to capture at least one image of the user's side-view face including the ear of the user automatically.

19. An information processing method comprising:
executing, by a computer, processes including:
- setting a first guide region for specifying a region occupied by a user's front-view face in an imaging region;
- in response to determining a size of the region occupied by the user's front-view face in the imaging region is below a first threshold, instructing the user to display the user's side-view face in the imaging region;
- setting a second guide region for specifying a region occupied by the user's side-view face in the imaging region, wherein the second guide region is different from the first guide region; and
- in response to a determination that a size of the region occupied by the user's side-view face in the imaging region is within a second threshold, determining whether the region occupied by the user's side-view face includes the user's ear based on at least one of: a ratio at which a region including the user's ear is included in the imaging region, a ratio of the region including the user's ear to the region occupied by the user's side-view face, or a distance between an end of the region including the user's ear and an end of the imaging region; and
- capturing at least one image of the user's side-view face including an ear of the user and acquiring data related to the at least one captured image automatically.

20. A non-transitory computer-readable medium comprising processor-executable instructions, the processor-executable instructions causing a computer to:
- set a first guide region for specifying a region occupied by a user's front-view face in an imaging region;
- in response to a determination that a size of the region occupied by the user's front-view face in the imaging region is within a first threshold, instruct the user to display the user's side-view face in the imaging region;
- set a second guide region for specifying a region occupied by the user's side-view face in the imaging region, wherein the second guide region is different from the first guide region;
- in response to a determination that a size of the region occupied by the user's side-view face in the imaging region is within a second threshold, determine whether the region occupied by the user's side-view face includes the user's ear based on at least one of: a ratio at which a region including the user's ear is included in the imaging region, a ratio of the region including the user's ear to the region occupied by the user's side-view face, or a distance between an end of the region including the user's ear and an end of the imaging region; and
- capture at least one image of the user's side-view face including an ear of the user and acquire data related to the at least one captured image automatically.

* * * * *